United States Patent [19]

Schmidt

[11] E Re. 30,262

[45] Reissued Apr. 29, 1980

[54] COMPRESSIVE LOAD CARRYING BEARINGS

[75] Inventor: Warren E. Schmidt, Erie, Pa.

[73] Assignee: Lord Corporation, Erie, Pa.

[21] Appl. No.: 553

[22] Filed: Dec. 26, 1978

Related U.S. Patent Documents

Reissue of:

[64] Patent No.: 3,679,197
Issued: Jul. 25, 1972
Appl. No.: 147,488
Filed: May 27, 1971

U.S. Applications:

[63] Continuation of Ser. No. 893,886, Apr. 6, 1978, abandoned.

[51] Int. Cl.[2] ..... B60G 11/22

[52] U.S. Cl. ..... 267/152; 308/2 A; 308/26

[58] Field of Search ..... 308/26, 2; 267/21 R, 267/21 A, 152, 63 R, 63 A, 140, 141; 287/85

[56] References Cited

U.S. PATENT DOCUMENTS

| | | | |
|---|---|---|---|
| 2,051,864 | 8/1936 | Knox | 267/21 |
| 2,066,187 | 12/1936 | Piron | 267/21 |
| 2,068,279 | 1/1937 | Piron | 267/21 |
| 2,069,270 | 2/1937 | Piron | 267/63 |
| 2,126,707 | 8/1938 | Schmidt | 267/63 |
| 2,127,219 | 8/1938 | Hirshfeld | 267/63 |
| 2,149,297 | 3/1939 | Knox | 267/21 |
| 2,158,028 | 5/1939 | Burke | 267/33 |
| 3,216,593 | 11/1965 | Reuter | 267/140 |
| 3,380,557 | 4/1968 | Peterson | 267/140 |
| 3,467,353 | 9/1969 | Peterson | 267/152 |
| 3,700,352 | 10/1972 | Gorndt | 416/134 |
| 3,759,632 | 9/1973 | Rybicki | 416/134 |

FOREIGN PATENT DOCUMENTS

| | | | |
|---|---|---|---|
| 680988 | 8/1939 | Fed. Rep. of Germany | 267/152 |
| 934336 | 5/1948 | France | 267/152 |
| 465394 | 5/1937 | United Kingdom . | |
| 828065 | 2/1960 | United Kingdom | 267/152 |

OTHER PUBLICATIONS

Lord Manufacturing-Technical Proposal 7L69-6, 5/23/69.

USAAVLABS Technical Report 71-16, Flight Evaluation of Elastomeric Bearings in an AH-1 Helicopter Main Rotor, C. H. Fagan, Mar. 1971.

Dynafacts, Lord Manufacturing Company, vol. 3, No. 4, 1960.

"Dynafacts", Lord Manufacturing Company, vol. 7, No. 3, 1964.

"Innovation in Vibration/Shock/Noise Control", Bulletin No. 910, 1966.

Dynafacts, Lord Manufacturing Company, vol. 11, No. 3, 1968.

Lord Library of Vibration/Shock/Noise Control, No. 49, 1968.

*Primary Examiner*—Ronald H. Lazarus
*Attorney, Agent, or Firm*—Howson and Howson

[57] ABSTRACT

A compressive load carrying laminated bearing comprising alternating bonded layers of a resilient material and a non-extensible material generally concentrically disposed about a common center with successive layers being disposed at successively increasing radii. The fatigue life thereof, when subjected to cylic rotational or torsional motion about the common center, is substantially enhanced by progressively increasing the thickness of the layers of resilient material with increasing radii while simultaneously progressively decreasing the modulus of elasticity of the layers of resilient material with increasing radii.

4 Claims, 4 Drawing Figures

COMPRESSIVE LOAD CARRYING BEARINGS

Matter enclosed in heavy brackets [ ] appears in the original patent but forms no part of this reissue specification; matter printed in italics indicates the additions made by reissue.

*This Application is a Reissue of Ser. No. 147,488 filed 5/27/71 now patent 3,679,197. This Application is also a continuation of Reissue Application 893,886 filed 4/6/78 now abandoned.*

This invention relates to compressive load carrying bearings and more particularily to laminated bearings comprising alternating bonded layers of a resilient material such as an elastomer and non-extensible material such as metal.

It has been shown that the compressive load carrying ability or capacity of a layer of resilient material in a direction perpendicular thereto may be increased many times through the inclusion of spaced parallel laminate of non-extensible material while the yielding capacity in that direction is correspondingly reduced. That is, a given thickness of rubber for instance loses its compressive resilience increasingly with the increased number of layers it is divided by parallel laminae of non-extensible material. At the same time its compressive load carrying capacity in that direction increases proportionately. However, the ability of the resilient material to yield in shear or torsion in a direction along the layers is almost completely unaffected by the laminations and is essentially the same whether the rubber is in one layer or a plurality of layers separated by layers of non-extensible material. For a more detailed understanding of such laminated bearings and basic factors to be considered in their design, reference is made to Wildhaber, U.S. Pat. No. 2,752,766 and Hinks, U.S. Pat. No. 2,900,182.

The above briefly described bearing concept has begun to find wide commercial acceptance in bearings characterized in their ability to carry relatively large compressive loads generally perpendicular to the layers while simultaneously being relatively soft in shear and/or torsion along the layers so as to readily accommodate relative movement in designated directions.

While the concept may be employed in bearings of a variety of configurations, depending on the compressive loads to be carried and the motions to be accommodated, many are constructed such that the alternating bonded layers of resilient material and non-extensible material are generally concentrically disposed about a common center with successive layers being disposed at successively increasing radii. Such configurations include cylindrical, conical, spherical, sectors of cylinders, cones and spheres, etc. Due to the configuration and use of these bearings to carrying large compressive loads while accommodating cyclic torsional motion about the common center, greater compressive stresses and shear stresses and strains are established in the resilient layers closest to the common center as compared to resilient layers more remote from the common center. In the normal case, these bearings are constructed with the layers of resilient material having the same modulus of elasticity, thickness and length. The prolonged use of such a bearing in accommmodating cyclic torsional motion results in failure from fatigue preferentially at the innermost resilient layer. Accordingly, the fatigue life of such a bearing is typically determined by the stresses and strains established during use in the innermost resilient layer.

It is an object of the present invention to improve the fatigue life of a laminated bearing comprising alternating bonded layers of resilient material and non-extensible material generally concentrically disposed about a common center with successive layers being disposed at successively increasing radii.

Briefly, the object of the present invention is accomplished by progressively increasing the thickness of the layers of resilient material with increasing radii while simultaneously progressively decreasing the modulus of elasticity of the layers of resilient material with increasing radii.

One of the objects of the invention having been stated, other objects wll appear as the description proceeds, when taken in connection with the accompanying drawings, in which.

Figure 3:
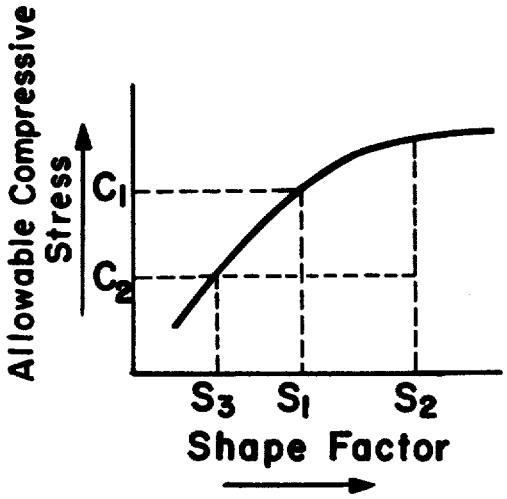
Figure 4:
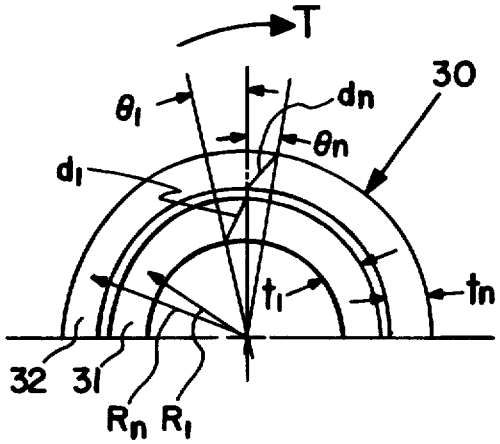

FIG. 3 graphically illustrates the effect of shape factor on allowable compressive stress; and FIG. 4 diagramatically illustrates shear strain distribution in a laminated bearing.

Figure 1:
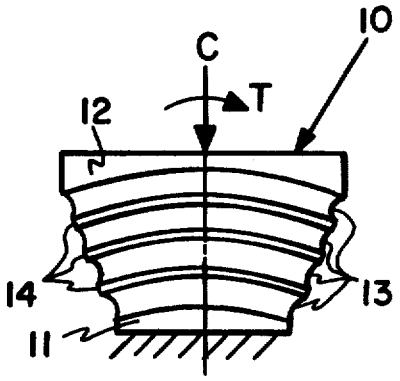
Prior Art Fig. 1.
FIG. 1 is a schematic plan view of a prior art laminated bearing.

With reference to FIG. 1, there is shown a conventional prior art laminated bearing 10 comprising an inner member 11 having an outwardly facing convex surface and an outer member 12 radially spaced from the inner member 11 and having an inwardly facing concave surface. Between and bonded to the members 11 and 12 are alternating bonded layers 13 and 14 of a resilient material such as an elastomer and a non-extensible material such as metal, respectively. The convex and concave surfaces and each of the layers 13 and 14 are concentrically disposed about a common center. Bearing 10 is in the form of a sector of a cylinder with each of layers 13 or resilient material having a generally uniform length. The layers 13 of resilient material are of uniform thickness and the resilient material of each layer 13 has the same modulus of elasticity. It will be apparent that the mean circumferential area of each layer 13 of resilient material increases with radii. Thus, the shape factor or ratio between effective load carrying area for a compressive load C centrally applied and bulge free area progressively increases with radii. Accordingly, for a given compressive load C, the compressive stress and strain are much greater on the innermost layer 13. Likewise for a torque T, the greatest shear stress and strain are on the innermost layer 13. The result is preferential fatigue at the innermost layer 11.

The problems in these prior art laminated bearings have been recognized to some extent as evidenced by Orain, U.S. Pat. No. 2,995,907 and Boggs, U.S. Pat. No. 3,377,110. Both of these references teach altering the shape of the bearing, namely length, to adjust the mean circumferential area of the outer resilient layers 13 and thus, provide a more uniform shear stress and strain distribution in the resilient layers 13 when subjected to a cyclic torsional motion to prolong the life of the innermost resilient layer 13. When graded length is employed to uniformly distribute shear stresses and strain, compressive stresses in the outermost layers is substantially increased. Thus, failure from excessive compressive stresses becomes important. Furthermore, stability of the bearing under high compressive loads is unfavorable. In addition, such bearings are often inadequate from a compression load capacity or are impractical to manufacture.

Figure 2:
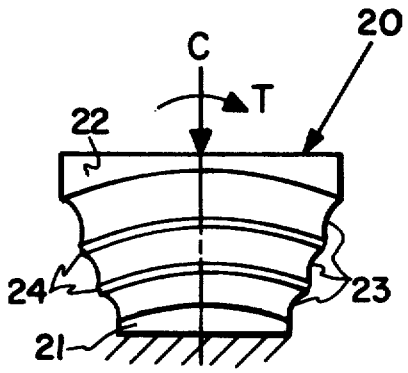
FIG. 2 is a schematic plan view of a laminated bearing similar to that of FIG. 1 incorporating the present invention.

By the present invention the shape of the convention laminated bearing can be retained while substantially enhancing the fatigue characteristics of the bearing without substantial sacrifice in compression deflection or compression load capacity. With reference to FIG. 2, there is shown a bearing 20 of the present invention in the form of a sector of a cylinder. As illustrated, bearing 20 comprises an inner member 21 having an outwardly facing convex surface and an outer member 22 radially spaced from the inner member 21 and having an inwardly facing concave surface. Between and bonded to the members 11 and 12 are alternating bonded layers 23 and 24 of a resilient material such as an elastomer and a non-extensible material such as metal, respectively. Inner and outer members 21 and 22 are identical to members 11 and 12 of bearing 10. As with bearing 10, the convex and concave surfaces and each of the layers 23 and 24 are concentrically disposed about a common center and each layer 23 of resilient material has a generally uniform length. However, rather than layers 23 of a resilient material having uniform thickness and uniform modulus of elasticity, the thickness of the layers 23 progressively increases from the common center while the modulus of elasticity progressively decreases from the common center. This simultaneous grading of thickness and modulus in the resilient layers 23 has been found to substantially enhance the fatigue life of a bearing subject to cyclic torsional motion.

To understand the benefits obtained by the present invention, let us first look at the effect of a compressive load C on a bearing. Each layer of resilient material in series must carry this compressive load C. For prior art bearing 10, FIG. 1, having uniform resilient layer 13 thickness, the effective load carrying area of each layer increases with increasing radii. Accordingly, the compressive stresses in the layers 13 decreases with increasing radii. With reference to FIG. 3 there is shown the typical relation between allowable compressive stress and shape factor for a given compressive load and modulus of elasticity of the resilient material. In the bearing 10, let us suppose the shape factor for the innermost layer is S, with a compressive stress $C_1$ and that the shape factor for the outermost layer is $S_2$. Since the compressive stress $C_2$ in the outer most layer is less than $C_1$, the shape factor at the outermost layer may be reduced to $S_3$, a value substantially less than that provided by bearing 10. One approach, as previously mentioned, is to grade the circumferential area. However, by the present invention, it has been found most desirable to grade the thickness of the resilient layers proportionally with radii. If the bearing 20 is to have the same overall dimensions of bearing 10, it is seen that by grading the thickness of resilient layers 23 additional resilient material can be used and less non-extensible material. While this approach also reduces to some extent the resistance to compression deflection of bearing 20, the advantages obtained are more than offsetting. By the inclusion of more resilient material radially of the bearing within the available space, the rotational stiffness of the bearing is decreased to require less work of the resilient layers in torsion for a given torsional motion reducing to some extent the shear stresses and strains on the innermost resilient layers.

Having considered the compressive stress distribution and the effect of grading the thickness of the resilient layers on shear stresses and strains, let us look in more detail at the bearing in torsion. It can be shown that the torsional or rotational spring rate $K_R$ of a spring is governed by the equation $K_R = K_S R^2$ where:

$K_S$ = spring rate in shear translation, and

R = distance from fixed pivot to center line of spring $K_S$.

Thus, for a laminated bearing wherein the layers are concentric about a common center, all other things being equal, the contribution of the outermost resilient layers to the rotational stiffness is considerably greater than the innermost resilient layers. Since the inner resilient layers are much softer in rotation than the outer resilient layers, the major portion of the deflection (strain) in torsion will occur at the inner layers, the innermost layer in particular.

The torsional strain in layers of resilient material in a laminated bearing 30 at different radial distances from the common center are shown in FIG. 4 where 31 designates an inner layer of thickness $t_1$ and mean radius $R_1$ and 32 designates an outer layer of thickness $t_n$ and mean radius $R_n$, each subject to a torque T. Under this torque, the inner layer 31 deflects in shear a distance $d_1$ or through an angle $\theta_1$ and the outer layer 32 deflects in shear a distance $d_n$ or through an angle $\theta_2$. The equations giving these strains are as follows:

1. $K_{r1}$ = rotational spring rate of layer 31 $= (T/\theta_1)$;
2. $K_{rn}$ = rotational spring rate of layer 32 $= (T/\theta_2)$;
3. $\theta_1 = (d_1/R_1)$ where $d_1$ is the tangential deflection of layer 31;
4. $\theta_2 = (d_n/R_n)$ where $d_n$ is the tangential deflection of layer 32;
5. $e_1$ = strain of layer 31 $= (d_1/t_1)$; and
6. $e_n$ = strain of layer 32 $= (d_n/t_n)$.

Substituting Equations 3 and 5 in Equation 1 gives:

7. $K_{r1} = (TR_1/d_1) = (TR_1/e_1t_1)$.

Substituting Equations 4 and 6 in Equation 2 gives:

8. $K_{rn} = (TR_n/d_n) = (TR_n/e_nt_n)$.

The ratio of Equations 7 and 8 gives:

$$\frac{K_{r1}}{K_{rn}} = \frac{\dfrac{TR_1}{e_1l_3}}{\dfrac{TR_n}{e_nl_n}} = \frac{R_1e_nl_n}{R_ne_1l_1}. \tag{9}$$

Substituting the values of $K_R = K_S R_1^2$ and $K_{Rn} = K_{Sn}R_n^2$, Equation 9 becomes $$\frac{K_{S1}R_1^2}{K_{Sn}R_n^2} = (R_1e_nljR_ne_1l_1). \tag{10}$$

Substituting in Equation 10 the values of $K_{S1} = (A_1G_1/t_1)$ and $K_{Sn} = (A_nG_n/t_n)$ where: $A_1$ and $A_n$ = Surface area of the respective layers 31 and 32; and $G_1$ and $G_n$ = Shear modulus of the respective layers 31 and 32, Equation (10) becomes:

$$\frac{\dfrac{A_1G_1}{t_1}}{\dfrac{A_nG_n}{t_n}} \frac{R_1^2}{R_n^2} = \frac{R_1e_nl_m}{R_ne_1t_1} \text{ which reduces to} \tag{11}$$

12. $(A_1G_1R_1/A_nG_nR_n) = e_n/e_1$.

In a given design then Equation 12 means that the strain is a direct function of area, modulus, and radius. In fatigue applications, then the desirable thing to have would be a condition where the strain $e_n$ across the outer layer 32 is equal to or approaching the strain $e_1$ across the inner layer 31.

Applying the Equation 12 to the layers a and n for a cylindrical or tube form laminated bearing having length 1,

13.

$(e_n/e_n)=A_nG_nR_n/A_nG_nR_n)=2\pi R_aG_aR_a/2\pi R_nG_nR_n)-=(G_aR_a2/G_nR_n^2)$ or

14. $(G_n/G_n)=R_n{}^2e_n/R_a{}^2e_a)$.

From Equation 14 it appears that the strain in layers n and a are equal if the modulus of elasticity varies inversely as the square of the mean radius of the respective resilient layers or $(G_a/G_{A'},)=(R_n^2/R_a^2)$.

It also appears that if the modulus of the layer a is equal to the modulus of the layer n, the strain will vary inversely as the square of the radius. For example, when $G_n=G_a$ and $R_n=2$ and $R_a=1$, $e_a=e_n(R_n^2/R_a^2)=4_{en}$.

Applying equation 12 to the layers x and n of a spherical laminated bearing:

15.

$(e_n/e_x)=(A_xG_xR_x/A_nG_nR_n)=(2\pi R_x^2G_xR_x/2\pi R_n^2G_nR_n)=(G_xR_x^3/G_nR_n^3)$.

From Equation 14 it appears that the strains in layers n and x are equal if the modulus of elasticity varies inversely as the cube of the mean radius of the respective resilient layers of $(G_x/G_{AH})=(R_n^3/R_x^3)$.

It also appears that if the modulus of the layers x is equal to the modulus of the layer n, the strain will vary inversely as the cubes of the radius. For example, when $G_n=G_x$, $R_n=2$ and $R_x=1$, $e_x=(e_nR_n^3/R_x^3)=8e_n$.

For the cylindrical laminated bearing, the strain in each resilient layer is uniform throughout the length. For the spherical laminated bearing, the strain varies along the length of each layer. This suggests that for spherical shapes the spring should occupy less than a hemisphere if permitted by other design requirements.

In practical designs, the variation in strain may be subject to correction factors due to variation in the geometry of the springs from the simple cylindrical and spherical shapes discussed. These correction factors in many instances may be empirically derived from test experiences. However, in general, it may be stated that for laminated bearings of the present invention, the fatigue life will be improved if the modulus of each layer varies inversely as an exponential of its radius as given by the following equation:

$$G_1=\frac{G_2R_2{}^2\pm M}{R_1{}^2\pm M}$$

where M is a number less than or equal to 1. More generally, it may be stated that improvement in fatigue life will be obtained if there is a progressive decrease in modulus of elasticity of the resilient material with increase in radii.

The above presentation clearly illustrates that in a laminated bearing comprising alternating bonded layers of a reslient material and a non-extensible material generally concentrically disposed about a common center with successive layers being disposed at successively increasing radii, it is advantageous to progressively increase the thickness of the layers of resilient material with increasing radii and to progressively decrease the modulus of elasticity of the layers of resilient material with increasing radii. By progressively increasing the thickness of the layers of resilient material with increasing radii more resilient material may be radially disposed within the same space with the compressive stresses in the resilient layers maintained within allowable limits. The increased amount of resilient material favorably redistributes the shear stresses and strains in torsion to enhance the fatigue life thereof. In addition the number of non-extensible laminae are decreased to reduce the overall weight and cost of manufacture. However, the graded thickness of the resilient layers approach cannot be utilized to optimize the shear-strain distribution. To complete optimization in design, it is necessary to grade the modulus of elasticity of the layers of resilient material such that it decreases with increasing radii. These two concepts cooperate to provide an optimum design in a laminated bearing adapted to accommodate relatively large cyclic torsional motions while carrying a high compressive load.

By way of illustration, a laminated bearing of the cylindrical or tube form was designed to carrying a compressive load of 70,000 pounds and to accommodate a cyclic torsional motion of 7°. The overall length of the bearing was 6 inches. The inside and outside radii were 1.620 and 2.750 inches, respectively. In a prior art design, having uniform thickness and modulus of elasticity in the resilient layer, a calculated fatigue life of 530 hours resulted. Where the thickness and modulus of elasticity were simultaneously graded in accordance with the present invention with the innermost resilient layer having the same thickness and modulus of elasticity as that of the innermost layer of the prior art bearing, a calculated fatigue life of approximately 6,200 hours resulted. Needless to say, the advantage obtained in fatigue life by the present invention is quite substantial.

In the drawings and specification, there has been set forth a preferred embodiment of the invention and, although specific terms are employed, they are used in a generic and descriptive sense only and not for purposes of limitation.

What is claimed is:

1. A compressive load carrying laminated bearing comprising alternating bonded layers of a resilient material and a non-extensible material generally concentrically disposed about a common center with successive layers being disposed at successively increasing radii with the thickness of said layers of resilient material progressively increasing with radii while the modules of elasticity of said layers of resilient material simultaneously decreases with radii.

2. A compressive load carrying laminated bearing comprising an inner support member having an outwardly facing convex surface, an outer support member having an inwardly facing concave surface radially spaced from the convex surface of said inner member, said convex and concave surfaces being concentrically disposed about a common center, alternating bonded layers of a resilient material and a non-extensible material disposed between and fixedly secured to the convex and concave surfaces of said inner and outer members, respectively, said layers of non-extensible material being concentrically disposed about said common center, successive layers of said resilient material and non-extensible material being disposed at successively increasing radii with the thickness of said layers of resilient material progressively increasing with radii while the modulus of elasticity of said layers of resilient material simultaneously decreases with radii.

*3. A compressive load carrying laminated bearing comprising alternating bonded layers of*

*a resilient material and*

*a non-extensible material*

*generally concentrically disposed about a common center with successive layers being disposed at successively increasing radii*

*with the thickness of said layers of resilient material progressively increasing with radii while the modulus of elasticity of said layers of resilient material simultaneously decreases with radii;*

*said compressive load carrying laminated bearing having a configuration comprising a generally conical, cylindrical or spherical shape or a segmented form thereof; and*

*said compressive load carrying laminated bearing being characterized by extended fatigue life resulting from a concurrent increase in resilient layer thickness and decrease in modulus of resilient layer elasticity moving generally radially outward from said common center.*

*4. A compressive load carrying laminated bearing comprising an inner support member having*

*an outwardly facing convex surface, an outer support member having*

*an inwardly facing concave surface radially spaced from the convex surface of said inner member,*

*said convex and concave surfaces being concentrically disposed about a common center, alternating bonded layers of a resilient material and a non-extensible material disposed between and fixedly secured to the convex and concave surfaces of said inner and outer members respectively, said layers of non-extensible material being concentrically disposed about said common center, successive layers of said resilient material and non-extensible material being disposed at successively increasing radii*

*with the thickness of said layers of resilient material progressively increasing with radii while the modulus of elasticity of said layers of resilient material simultaneously decreases with radii,*

*said compressive load carrying laminated bearing having a configuration comprising a generally conical, cylindrical or spherical shape or a segmented form thereof; and said compressive load carrying laminated bearing being characterized by extended fatigue life resulting from a concurrent increase in resilient layer thickness and decrease in modulus of resilient layer elasticity, moving generally radially outward from said common center.*

* * * * *

UNITED STATES PATENT AND TRADEMARK OFFICE

CERTIFICATE OF CORRECTION

PATENT NO. : Re. 30,262

DATED : April 29, 1980

INVENTOR(S) : Warren E. Schmidt

It is certified that error appears in the above-identified patent and that said Letters Patent are hereby corrected as shown below:

Col. 2, line 40, change "or" to read --of--.

Col. 3, line 45, change "S," to read --$S_1$--.

Col. 4, lines 43-48, change the entire formulation to read:

$$\frac{K_{r_1}}{K_{r_n}} = \frac{\frac{TR_1}{e_1 t_1}}{\frac{TR_n}{e_n t_n}} = \frac{R_1 e_n t_n}{R_n e_1 t_1}$$

Col. 4, line 49, change "$K_R = K_S R_1^2$" to read --$K_{R_1} = K_{S_1} R_1^2$--.

Col. 4, lines 51-54, the formula 10 should read:

$$\frac{K_{S_1} R_1^2}{K_{S_n} R_n^2} = \frac{R_1 e_n t_n}{R_n e_1 t_1}$$

UNITED STATES PATENT AND TRADEMARK OFFICE

CERTIFICATE OF CORRECTION

PATENT NO. : Re. 30,262

DATED : April 29, 1980

INVENTOR(S) : Warren E. Schmidt

It is certified that error appears in the above-identified patent and that said Letters Patent are hereby corrected as shown below:

Col. 4, l. 62-65, change the formula 11 to read:

$$\frac{\frac{A_1G_1}{t_1}}{\frac{A_nG_n}{t_n}} \qquad \frac{R_1^{\,2}}{R_n^{\,2}} = \frac{R_1e_nt_n}{R_ne_1t_1}$$

Col. 5, lines 11 and 12, change the formula to read:

$$(e_n/e_a) = (A_aG_aR_a/A_nG_nR_n) =$$
$$(2\pi R_aG_aR_a/2\pi R_nG_nR_n) =$$
$$(G_aR_a^{\,2}/G_nR_n^{\,2})$$

Col. 5, line 13, formula 14 should read:

$$G_a/G_n = R_n^{\,2}e_n/R_a^{\,2}e_a$$

Col. 5, line 17, change the formula to read:

$$(G_a/G_n) = (R_n^{\,2}/R_a^{\,2})$$

UNITED STATES PATENT AND TRADEMARK OFFICE

CERTIFICATE OF CORRECTION

PATENT NO. : Re. 30,262

DATED : April 29, 1980

INVENTOR(S) : Warren E. Schmidt

It is certified that error appears in the above-identified patent and that said Letters Patent are hereby corrected as shown below:

Col. 5, line 30, change the formula to read:

$G_x G_n = R_n^3 / R_x^3$

Col. 5, line 62, change "reslient" to --resilient--.

Col. 6, line 21, change "carrying" to --carry--.

Col. 6, line 7 of claim 1, change "modules" to --modulus--.

Signed and Sealed this

*Twelfth* Day of *October 1982*

[SEAL]

*Attest:*

GERALD J. MOSSINGHOFF

*Attesting Officer* *Commissioner of Patents and Trademarks*